Patented May 27, 1947

2,421,024

UNITED STATES PATENT OFFICE 2,421,024

LINEAR POLYMER CONTAINING CYCLIC IMIDE GROUPS

Carl J. Frosch, Summit, N. J., assignor to Bell Telephone Laboratories, Incorporated, New York, N. Y., a corporation of New York No Drawing. Application March 24, 1942, Serial No. 435,966

14 Claims. (Cl. 260—78)

This invention relates to synthetic linear polymers, and more particularly to high molecular weight synthetic linear polymers having cyclic imide groups in their molecular chains and possessing valuable properties, and to methods of making such linear polymers.

Synthetic linear polymers have heretofore been disclosed in United States Patent 2,071,250 and related patents. However, such prior linear polymers all are produced by condensation of bifunctional reactants or their derivatives and all have molecular chains consisting of divalent organic radicals connected together by simple, non-cyclic linkages, such as ester, amide, ether, and anhydride linkages. Certain of such prior linear polymers of sufficiently high molecular weights may be formed into useful fibers or other articles, and may also have the desirable property of increasing in strength and other properties when subjected to a cold drawing or cold working operation involving tensile stressing.

According to the prior art, reaction between a polycarboxylic acid and a complementary polyfunctional reactant having a plurality of groups reactive with carboxyl groups, at least one of which reactants has at least three functional or reactive groups, results in the formation of a non-linear resin having a networked molecular structure. Such resins cannot be formed into useful fibers and are not capable of being cold worked or cold drawn to increase their strength or other properties.

In contradistinction and in contradiction to such teachings of the prior art, the present invention provides linear polymers which are produced by reaction of polycarboxylic acids having more than two carboxyl groups with polyfunctional reactants having groups reactive with said carboxyl groups. A linear polymer embodying the invention has a molecular chain embodying divalent organic radicals connected together by cyclic imide groups constituting at least a substantial portion of the linkages connecting together such divalent organic radicals.

By choice of proper reactants linear polymers embodying the invention may be readily formed which are crystalline solids at ordinary temperatures and which when of sufficiently high molecular weights, are capable of being cold worked or cold drawn to increase the tensile strength and other properties of the polymers. The materials of the present invention may be formed into fibers, films, or sheets, or may be employed as impregnants, adhesives, coating materials or for other purposes. In particular, fibers or sheets of materials of the present invention which are crystalline in nature and which possess the property of cold working or cold drawing are particularly useful.

Advantageous linear polymers embodying the invention may be produced by condensing under linear polymerizing conditions a suitable imide-forming tricarboxylic acid and a complementary polyfunctional reactant having reactive groups consisting of a primary amino group and another group reactive with a carboxyl group under the linear polymerizing conditions. Such polyfunctional reactant may be a monohydroxy mono-primary-amino alcohol-amine, or a diamine in which at least one amino group is primary and the other amino group has at least one available hydrogen atom connected to its nitrogen atom. In the case where a diamine is the complementary reactant particularly advantageous polymers are produced when a diprimary diamine is employed.

More particularly, the tricarboxylic acid is of the formula $$HOOC-R_1-CR_3-R_2-COOH \quad (A)$$

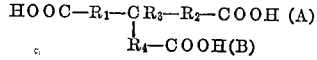

$$R_4-COOH \quad (B)$$

in which $R_1$ and $R_2$ each is a divalent organic radical of chain or cyclic structure, such as a divalent hydrocarbon radical, containing no groups reactive under the linear polymerizing conditions with any of the functional groups involved in the polymerization reaction, e. g., carboxyl, amino or hydroxyl groups, and is preferably a methylene or polymethylene radical; $R_3$ is hydrogen or a monovalent organic radical of chain or cyclic structure, such as a monovalent hydrocarbon radical, containing no group reactive under the linear polymerizing conditions with any of the functional groups involved in the polymerization reaction, e. g., carboxyl, amino, or hydroxyl groups; and $R_4$, which may be omitted, but if present is a divalent organic radical of chain or cyclic structure, such as a divalent hydrocarbon radical, containing no groups reactive under the linear polymerizing conditions with any of the functional groups involved in the polymerization reaction, e. g., carboxyl, amino, and hydroxyl groups, and is preferably a methylene or polymethylene radical. The carboxyl groups indicated as (A) and (B) of the tricarboxylic acid are arranged in imide-forming relation; that is, they are so arranged that they tend to react with a single primary amino group through its hydrogen atoms to form a cyclic imide group containing the nitrogen atom of the primary amino group. The carboxyl groups (A) and (B) of a tricarboxylic acid employed according to the invention in general are in imide-forming relation when they are capable of reacting with a primary amino group to form a ring of five or six atoms including the common nitrogen atom, which requirement restricts the chain lengths of radicals $R_2$ and $R_4$. An example of a readily available tricarboxylic acid of the kind described above is tricarballylic acid:

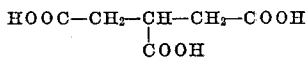

To produce a linear polymer embodying the invention, a tricarboxylic acid of the kind described above may be reacted with an alcohol-amine of the formula $NH_2$—$R_5$—$OH$ or a diamine of the formula

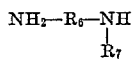

In the above formula for the alcohol-amine $R_5$ is a divalent organic radical of chain or cyclic structure, such as a divalent hydrocarbon radical, containing no groups reactive under the linear polymerizing conditions with any of the functional groups involved in the polymerization reaction, e. g., carboxyl, amino, and hydroxyl groups, and is preferably a polymethylene radical; it should include a chain of at least two carbon atoms between the —$NH_2$ and —$OH$ groups. In the formula for the diamine $R_6$ is a divalent organic radical of chain or cyclic structure, such as a divalent hydrocarbon radical, containing no groups reactive under the linear polymerizing conditions with any of the functional groups involved in the polymerization reaction, e. g., carboxyl, amino, and hydroxyl groups, and is preferably a polymethylene radical; it should contain a chain of at least two carbon atoms between the two —$NH_2$ groups; $R_7$ is hydrogen or a monovalent organic radical, such as a monovalent hydrocarbon group, containing no groups reactive under the polymerizing conditions with any of the functional groups involved in the linear polymerization reaction, e. g., carboxyl, amino, and hydroxyl groups.

The tricarboxylic acid and the polyfunctional reactant should be employed in substantially such proportions that of the three carboxyl groups of the tricarboxylic acid two carboxyl groups are present for the primary amino group of the polyfunctional reactant and one carboxyl group is present for the other functional group of the polyfunctional reactant. Thus to form a linear polymer of the invention substantially entirely by reaction of a tricarboxylic acid with a monohydroxy mono-primary-amino alcohol-amine, substantially equimolecular proportions of such reactants are employed. To form a linear polymer of the invention substantially entirely by reaction of a tricarboxylic acid and a diamine, substantially equimolecular proportions are employed. Of course, a small excess of either one of the polymerizable reactants may be employed in the known manner to control the molecular weight. Alternatively or additionally, for molecular weight control purposes, it may be desirable to employ a small amount of a monofunctional reactant in addition to the acid and its complementary reactant, such as a monocarboxylic acid, monohydroxy alcohol, or monoamine.

When a tricarboxylic acid of the kind indicated above and an amino alcohol of the kind indicated above are reacted under linear polymerizing conditions in equimolecular proportions according to the invention, a linear polymer embodying the invention is produced according to a reaction similar to, if not identical with, the following:

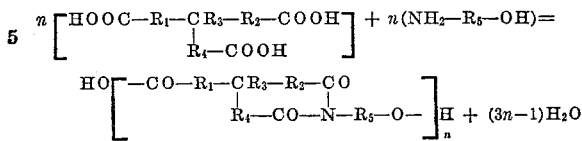

in the reaction product of which reaction $R_1$ and $R_5$ are divalent radicals connected together by alternate ester and cyclic imide groups to form the linear molecules of what may be termed a linear polyimide-ester.

When a tricarboxylic acid of the kind indicated above and a diamine of the kind indicated above are reacted under linear polymerizing conditions in equimolecular proportions according to the invention, a linear polymer embodying the invention is produced according to a reaction similar to, if not identical with, the following:

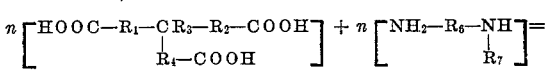
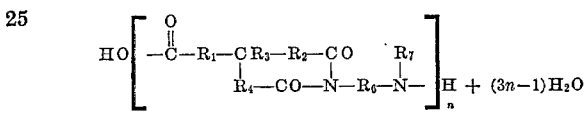

in the reaction product of which reaction $R_1$ and $R_6$ are divalent radicals connected together by alternate amide and cyclic imide groups to form the linear molecules of what may be termed a linear polyimide-amide.

In the manufacture of the linear polymers of the present invention, the polymerizable reactants are heated in polymerizable proportions and under linear polymerizing conditions to a temperature generally in the range of about 120° to about 300° C. until a product of the desired molecular weight is formed.

The polymerization reaction can be carried out at atmospheric, superatmospheric or subatmospheric pressures, with or without suitable catalysts. The last stages of the reaction at least should be carried out under conditions which permit the escape of the by-product of the reaction and at temperatures above the melting point of the reactants and reaction product.

In general, the reaction should be carried out in the absence of oxygen, e. g., in an atmosphere of hydrogen, nitrogen or in a vacuum. A convenient method of carrying out the polymerization reaction involves heating the mixture of polymerizable reactants in polymerizable proportions to a suitable polymerizing temperature above the melting point of the reactants and reaction product, but below the decomposition temperatures of such substances, in a suitable vessel provided with means by which an oxygen-free inert gas, such as hydrogen or nitrogen, may be bubbled through the reaction mixture and product during the reaction to agitate the materials and protect the reaction product from the oxygen of the atmosphere.

Crystallizable linear polymers of the invention in general do not possess the properties desired for most uses until their molecular weights are so high that the polymers reach the fiber-forming stage. The fiber-forming stage can be tested for merely by touching the molten polymer with a rod and drawing the rod away. If this stage has been reached, a continuous filament of considerable strength and pliability is formed. In general, this stage is reached when the polymer has an intrinsic viscosity of at least about 0.4, where the intrinsic viscosity is defined as $$\frac{\log_e \eta_r}{C}$$

in which $\eta_r$ is the viscosity of a dilute solution of the polymer in a suitable solvent such as m-cresol, divided by the viscosity of the solvent in the same units and at the same temperature (conveniently 25° C.), and C is the weight in grams of the polymer per 100 cubic centimeters of solution. An intrinsic viscosity of 0.4 indicates a molecular weight of about 7,000–10,000, while higher intrinsic viscosities indicate higher molecular weights.

In the manufacture of the polymers of the present invention, the acids, alcohol-amines, or diamines as such may be employed; however, the polymers of the invention can also be prepared by reacting suitable derivatives of the polymerizable reactants; for example, suitable salts or esters of the tri-carboxylic acids may be employed. Reference to acids and others reactants in the specification and claims is intended to include equivalent derivatives of such substances.

The presence or lack of crystallinity, or the degree of crystallinity of polymers embodying the invention is associated with the molecular structure of the polymers. As a general rule, the presence of side chains or other side substituents on the linear molecules of a polymer of the invention tends to reduce the crystallinity of the polymer and increase the tendency of the polymer to remain amorphous on cooling from the molten state. The effect of side substituents in the groups forming the linkages such as the ester, amide, or imide groups, between the divalent organic radicals of the linear molecules is particularly marked in reducing crystallinity. Cyclic groups other than the imide groups in the linear molecules also tend to reduce the crystallinity. However, polymers embodying the invention may have linear molecules having such cyclic groups and/or side substituents and still be crystalline, since the particular molecular configuration determines in each case whether the material is crystalline or amorphous.

In general, linear polymers embodying the invention which are formed of aliphatic acids and aliphatic complementary reactants so that the resulting polymer contains no side substituents or cyclic groups other than the imide groups and has straight divalent aliphatic chains between the linking groups are almost invariably crystalline and have the highest degree of crystallinity. Hence they are most advantageous for most uses.

Linear polymers embodying the invention which are crystalline solids at room temperatures usually contain substantial amounts of amorphous material between the very small crystallites constituting the crystalline phase. Such amorphous material lends toughness and flexibility to the polymer, while the crystallites provide strength. When such a crystalline polymer of a sufficiently high molecular weight to be in the fiber-forming stage is cold worked by being subjected to tensile stress at room or only slightly elevated temperatures or as by being cold drawn in fiber form, the polymer becomes permanently elongated and reduced in cross section and its strength, toughness, and pliability are greatly increased. Examination of such cold worked or cold drawn polymers under the X-ray indicates orientation in the direction of the stress or fiber axis.

While polymers embodying the invention which are crystalline in nature and possess the property of cold drawing are extremely advantageous, the present invention also includes polymers of a molecular weight not sufficiently high to provide the cold drawing phenomenon or which do not possess it for other reasons. The invention also includes linear polymers which are predominantly or entirely amorphous, or even liquids at ordinary temperature. Such materials may be used for various purposes, such as adhesives, coating or impregnating materials, etc.

Fibers, films, sheets, coatings, molded articles, impregnated materials and other articles may be prepared from the polymers of the invention, either from the melt or from solutions, by methods known in the art. Thus, cold drawn fibers may be produced from suitable polymers embodying the invention by the known procedures employed for producing such materials from linear polymers capable of cold drawing.

The following examples illustrate the preparation and properties of polymers of the present invention:

Example 1

One mol of tricarballylic acid was reacted with one mol of decamethylene diamine for about two hours at 225° C. in a container provided with means permitting oxygen-free nitrogen gas to be bubbled through the reaction mixture during the heating for the purpose of agitating the reaction mixture and preventing access of oxygen thereto. At the end of this period a viscous liquid was produced which crystallized to a hard, tough, white solid melting sharply at about 94° C. When the material was in the molten state fibers were drawn therefrom which, when subjected to tensile stress, displayed the property of cold drawing.

Example 2

One mol of tricarballylic acid and one mol of nonamethylene diamine were heated for about twenty hours at a temperature of 230° C. while a stream of oxygen-free nitrogen gas was bubbled through the reaction mixture. At the end of this period the reaction product was a viscous liquid which, on cooling, quickly crystallized to a very hard, amber solid. Fibers were drawn from the molten material and were found to possess the property of cold drawing.

Example 3

One mol of tricarballylic acid and one mol of 1,10 decanolamine were reacted for about four hours at a temperature of about 225° C. while being constantly agitated by oxygen-free nitrogen gas bubbled through the reaction mixture. At the end of this period the resulting reaction product was a viscous liquid which, on cooling, crystallized slowly to a fairly soft but flexible solid melting at about 70° C. Fibers were drawn from the molten polymer, and were found to possess the property of cold drawing. X-ray fiber diagrams of the cold drawn fibers indicated orientation along the length of the fiber axis.

Example 4

One mol of tricarballylic acid and one mol of ethylene diamine were reacted for eighteen hours at a temperature of about 230° C., during which period oxygen-free nitrogen gas was bubbled through the reaction mixture. At the end of this period the reaction product was a clear, very viscous liquid which solidified very rapidly to a very hard, clear amber solid. This solid melted sharply at about 170° C. It was quite brittle and could not be cold drawn into oriented fibers.

*Example 5*

Tricarballylic acid and propylene diamine in a molar ratio of 1.00:1.00 were reacted for approximately eighteen hours at about 230° C. while being agitated by oxygen-free nitrogen gas bubbled through the reaction mixture. A product similar to that of Example 4 but melting sharply at about 189° C. was produced.

While in the above discussion linear polymers were described primarily as being produced by the reaction of a tricarboxylic acid with either an alcohol-amine or a diamine, linear interpolymers embodying the invention may also be produced by reacting a tricarboxylic acid with both an alcohol-amine and a diamine, the proportions of the reactants being, of course, so chosen that sufficient primary amino groups are provided by the alcohol-amine and diamine to react with the imide-forming carboxyl groups of the acid and sufficient other reactive groups are provided by the diamine and alcohol-amine to react with the remaining carboxyl groups of the acid, so that a linear polymer may be formed. Moreover, more than one tricarboxylic acid in conjunction with either or both an alcohol-amine and a diamine may be employed in the production of linear interpolymers embodying the invention. The present invention also includes linear interpolymers made up of a plurality of tricarboxylic acids, a plurality of diamines, and a plurality of alcohol-amines, as well as other combinations of reactants.

Linear polymers embodying the invention can also be produced by reacting diprimary diamines with tetracarboxylic acids of the kinds described in the copending application, Serial No. 435,967, filed March 24, 1942, by the present inventor. Furthermore, linear polymers embodying the present invention can be produced by reacting mixtures of tricarboxylic and tetracarboxylic acids with one or more diamines, or with one or more alcohol-amines, or with one or more diamines and one or more alcohol-amines, the reactants being chosen in the proper proportions to produce linear polymers having molecular chains containing cyclic imide groups as the linkages between divalent organic radicals.

Linear interpolymers embodying the invention may also be produced by employing as reactants mixtures of tricarboxylic and/or tetracarboxylic acids and dicarboxylic acids, with the diamines or mixtures of alcohol-amines and diamines in suitable polymerizable proportions. Polymeric materials may be made by mixing together in the liquid state two or more linear polymers embodying the invention or at least one such polymer and one or more other compatible materials, such as other linear polymers.

Other modifications than those indicated above may be made in the materials and processes of the present invention. Thus, it may be found desirable to incorporate in the polymer-forming materials other reactive materials such as those which might cause more or less cross-linking between adjacent linear molecules upon suitable treatment. If desired, modifying agents such as plasticizers, pigments, resins, delustrants, etc., may be added before, during, or after polymerization.

The term "linear polymer" in the claims is intended to include essentially linear interpolymers and essentially linear modified polymers of the nature indicated above.

The linear polymers of the present invention may be employed to advantage for various purposes. Thus, fibers, either continuous or of staple length, may be produced from linear polymers embodying the invention and, particularly if cold drawn, may be employed for various purposes as in threads, cords, textiles, fabrics, etc. The materials of the present invention because of their insulation, abrasion and weather resistance and because of their toughness and flexibility may be employed to good advantage as coatings for electrical conductors. Such a coating may be in the form of an enamel coating on a bare wire, or in the form of a textile covering over the bare wire or over a previously applied coating of insulation such as rubber, or as an impregnant for a textile covering. Materials embodying the present invention may be employed as enamels and impregnants for other purposes, as adhesive cements, as molding materials, etc. Other uses are apparent to those skilled in the art.

It is intended that the patent shall cover by suitable expression in the appended claims whatever features of patentable novelty reside in the invention.

What is claimed is:

1. A process for producing a linear polymer containing cyclic imide groups in its molecular chains comprising heating under linear condensation polymerizing conditions according to which reaction by-products are removed a reaction mixture essentially comprising tricarballylic acid, and a bifunctional reactant which has as one functional group a primary amino group and as the other functional group a group chosen from the class consisting of an alcoholic hydroxyl group and amino groups having at least one replaceable hydrogen atom attached to the nitrogen atom and which has its functional groups separated by at least two carbon atoms and is free of groups other than its functional groups which are reactive with carboxyl, amino or hydroxyl groups, said reactants being present only in substantially such proportions that only two functional groups of said bifunctional reactant are present for each three carbozyl groups of said acid.

2. The process of claim 1 in which said bifunctional reactant is a diamine having a primary amino group and another amino group which has at least one replaceable hydrogen atom on its nitrogen atom, which diamine has its amino groups separated by at least two carbon atoms and is free of groups other than its amino groups which are reactive with carboxyl, amino, or hydroxyl groups.

3. The process of claim 1 in which said bifunctional reactant is a monohydroxy-monoamine having a primary amino group and an alcoholic hydroxyl group, which monohydroxy-monoamine has its amino and hydroxyl groups separated by at least two carbon atoms and is free of groups other than its functional groups which are reactive with carboxyl, amino, or hydroxyl groups.

4. A linear polymer containing cyclic imide groups in its molecular chain having a composition which is that of the reaction product formed by heating under linear condensation polymerization conditions according to which reaction by-products are removed a reaction mixture essentially comprising tricarballylic acid and a bifunctional reactant which has as one functional group a primary amino group and as the other functional group a group chosen from the class consisting of an alcoholic hydroxyl group and amino groups having at least one available hydrogen atom attached to the nitrogen atom and which has its functional groups separated by at least two carbon atoms and is free of groups other than its functional groups which are reactive with carboxyl, amino, or hydroxyl groups, said reactants being present only in substantially such proportions that only two functional groups of said bifunctional reactant are present for each three carboxyl groups of said acid.

5. The polymer of claim 4 in which said bifunctional reactant is a diamine having a primary amino group and another amino group having at least one replaceable hydrogen atom on its nitrogen atom, which diamine has its amino groups separated by at least two carbon atoms and is free of groups other than its amino groups which are reactive with carboxyl, amino, or hydroxyl groups.

6. The polymer of claim 4 in which said bifunctional reactant is a monohydroxy-monoamine having a primary amino group and an alcoholic hydroxyl group, which monohydroxy-monoamine has its functional groups separated by at least two carbon atoms and is free of groups other than its functional groups which are reactive with carboxyl, amino, or hydroxyl groups.

7. Sheets formed of the material of claim 4.

8. The polymer of claim 4 in which said bifunctional reactant is one in which the functional groups are separated by a paraffinic aliphatic chain of at least two carbon atoms.

9. The process of claim 1 in which said bifunctional reactant is one in which the functional groups are separated by a paraffinic aliphatic chain of at least two carbon atoms.

10. The polymer of claim 4 in which said bifunctional reactant is ethylene diamine.

11. The polymer of claim 4 in which said bifunctional reactant is decamethylene diamine.

12. The polymer of claim 4 in which said bifunctional reactant is 1,10 decanolamine.

13. A process for producing a linear polyamide containing cyclic imide groups which comprises heating at polymerizing temperature a reaction mixture consisting essentially of substantially equimolecular amounts of decamethylene diamine and tricarballylic acid and continuing said heating with elimination of by-products until fibers drawn from the product have the property of cold drawing.

14. A linear polymer which contains cyclic imide groups and which is the reaction product formed by heating at polymerizing temperature a reaction mixture consisting essentially of substantially equimolecular amounts of decamethylene diamine and tricarballylic acid and continuing said heating with elimination of by-products until fibers drawn from the product have the property of cold drawing.

CARL J. FROSCH.

REFERENCES CITED

The following references are of record in the file of this patent:

UNITED STATES PATENTS

| Number | Name | Date |
|---|---|---|
| 2,149,273 | Carothers | May 7, 1939 |
| 2,048,778 | Brubaker et al. | July 28, 1936 |
| 2,304,687 | Hagedorn | Dec. 8, 1942 |

FOREIGN PATENTS

| Number | Country | Date |
|---|---|---|
| 485,883 | Great Britain | May 26, 1938 |
| 376,929 | Great Britain | July 21, 1932 |